(12) United States Patent
Taylor (10) Patent No.: US 11,026,545 B2
(45) Date of Patent: Jun. 8, 2021

(54) CUTTING BOARD

(71) Applicant: Donna Plant Taylor, Hilton Head Island, SC (US)

(72) Inventor: Donna Plant Taylor, Hilton Head Island, SC (US)

(*) Notice: Subject to any disclaimer, the term of this patent is extended or adjusted under 35 U.S.C. 154(b) by 261 days.

(21) Appl. No.: 16/100,522

(22) Filed: Aug. 10, 2018

(65) Prior Publication Data
US 2019/0053670 A1    Feb. 21, 2019

Related U.S. Application Data

(60) Provisional application No. 62/605,644, filed on Aug. 21, 2017.

(51) Int. Cl.
    *A47J 47/00*      (2006.01)
(52) U.S. Cl.
    CPC .................... *A47J 47/005* (2013.01)
(58) Field of Classification Search
    CPC ...... A47J 47/005; A47J 47/00; A47J 2201/00; A47J 43/18
    See application file for complete search history.

(56) References Cited

U.S. PATENT DOCUMENTS

| | | | | |
|---|---|---|---|---|
| 2,963,957 | A | * | 12/1960 | Tashman ............... A47J 47/005 99/421 R |
| 4,063,645 | A | * | 12/1977 | Canterman ............... B07C 7/04 209/702 |
| 5,996,983 | A | | 12/1999 | Laurenzi |
| 6,651,970 | B2 | | 11/2003 | Scott |
| 7,530,558 | B2 | * | 5/2009 | Casale ................. A47J 47/005 269/13 |
| D752,270 | S | | 3/2016 | Saunders et al. |
| D795,028 | S | | 8/2017 | Vanatti |

* cited by examiner

*Primary Examiner* — Tyrone V Hall, Jr.
*Assistant Examiner* — Abbie E Quann
(74) *Attorney, Agent, or Firm* — Dority & Manning, P.A.

(57) ABSTRACT

A cutting board has a cutting surface and two other laterally adjacent that may be positioned on either side for either left or right-handed users. An ergonomically designed gripping stop on one lateral side has a stop upper surface raised above the cutting surface to engage a food item to be cut. The raised stop element has a specific holder portion with plural ridged teeth and a cutting guide portion to guide free hand knife usage. A second feature is a recessed, downward sloping trough built into in the cutting board to receive cut food items to be measured using a pre-marked scale formed in the cutting board trough. A removable gate member prevents cut food items from leaving the channel until accrued to a desired measurement amount, and when removed, allows measured food items to be discharged through a lower mouth.

18 Claims, 11 Drawing Sheets

CUTTING BOARD

PRIORITY CLAIMS

This application claims the benefit of previously filed U.S. Provisional Patent Application entitled "CUSTOM CUTTING BOARD WITH FOOD ITEM GRIPPING STOP AND MEASURING CUP SLIDE," assigned U.S. Ser. No. 62/605,644, filed Aug. 21, 2017, and U.S. Design Patent Application entitled "CUTTING BOARD," assigned U.S. Ser. No. 29/638,679, filed Feb. 28, 2018, both of which are incorporated herein by reference for all purposes.

FIELD OF THE PRESENTLY DISCLOSED SUBJECT MATTER

The presently disclosed subject matter generally relates to cutting boards and corresponding methodologies, and more particularly to custom cutting boards provided with either or both of a food item gripping stop and a measuring cup slide, and associated methodologies. In some instances, presently disclosed subject matter relates to devices and corresponding and/or related methodologies for assisting cutting of food items, regardless of whether the user is predominantly left-handed or right-handed.

BACKGROUND OF THE PRESENTLY DISCLOSED SUBJECT MATTER

Chefs and cooks often have difficulty using a cutting board because the food items placed upon the board will move or slide around the board while the individual is attempting to cut or slice them. Such problem can lead to irregular cuts and inconsistently sized pieces of the food item, wasted time trying to re-position the food items repeatedly, and in the worse cases, injuries to the hand or fingers while trying to secure and hold the food item steady while cutting it.

Chefs and cooks also waste time and effort, and occasionally lose food items, by attempting to transfer cut food items from a cutting board, into a measuring cup, and then into a pan or pot for cooking, or tray or bowl for presentation to the consumer or diner.

Therefore, currently there is a need for improved cutting boards and corresponding and/or related methodologies.

U.S. Pat. No. 6,651,970 describes a multi-functional cutting board having multiple cutting surfaces for use in different applications. U.S. Pat. No. 5,996,983 describes a board and waste container arrangement for a work surface having an edge, which includes a waste container having an open top, side walls and a bottom defining a waste receptacle for placement next to the edge of a work surface in a use position for the container.

U.S. Design Pat. No. D795,028 illustrates an inclined cutting board, and U.S. Design Pat. No. D752,270 illustrates a carving station.

While various implementations of devices for assisting cutting of food items have been developed, no design has emerged that generally encompasses all of the desired characteristics as hereafter presented in accordance with the subject presently disclosed technology.

SUMMARY OF THE PRESENTLY DISCLOSED SUBJECT MATTER

In view of the recognized features encountered in the prior art and addressed by the presently disclosed subject matter, improved apparatus and methodology are presently disclosed for devices for assisting cutting of food items. It is to be understood that the presently disclosed subject matter equally encompasses both apparatus and methodology.

In exemplary part, various alternative configurations of presently disclosed subject matter are intended to be usable in alternative arrangements which are provided as suited for individual users who are either predominantly right-handed or left-handed, either through physical reversal of devices or portions thereof, or through reversal of method steps or similar adjustments.

In accordance with certain aspects of certain embodiments of the presently disclosed subject matter, the presently disclosed subject matter relates in part to a cutting board that features either or both of two particular features. For some presently disclosed embodiments, one feature relates to an ergonomically designed device or component comprising a gripping vegetable stop that has a portion that is raised relative to an associated cutting board surface in order to function as a "stop" or "block" for one end of the food item to be cut.

For some other presently disclosed embodiments, one additional or in some instances alternative feature may comprise a relatively recessed, downward sloping trough into which cut food items may be easily pushed or moved and then measured in the cutting board by means of a pre-marked, scaled trough formed in the presently disclosed cutting board. In accordance with presently disclosed associated and/or corresponding methodology, a simple, quick hand movement by a user, using an exposed hand or a customized scrapper, the subject cut food items may be dropped directly in to a pot or pan, or dropped directly onto a serving plate or platter, without the need of using another measuring cup or dirtying another plate for transfer of the cut or selected food items.

In yet other presently disclosed exemplary embodiments, subject matter may include features having an ergonomically designed gripping vegetable stop (such as with an onion holder and first cut guide), which in some embodiments is a raised, angled block, forming a preferred positioning stop for working a vegetable in the center of the cutting board, or for example addressing an onion at the front of the cutting board. In some instances, such stop feature may comprise ridged "teeth" on a food item side that securely grip the end of presented vegetables (for example, such as carrots, celery, cucumbers, peppers, and/or others).

In some such embodiments, such angled stop is specifically designed to position a vegetable or fruit being worked at an exact angle that a person's dominant hand holding a knife will approach the food item. Using such feature of the presently disclosed cutting board, a user never has to awkwardly attempt to find the correct and/or comfortable angle for his or her wrist while wielding a sharp knife. Such angle is pre-set to draw the blade to a perfectly perpendicular cut on the food item.

Per yet additional features and aspects of some embodiment of the presently disclosed subject matter, such a stop may also be designed to form a perfect hold for one of the most difficult tasks faced by every chef and cook—preparing a diced onion. For example, in some embodiments, a user simply slices off a small section of the onion to create a flat bottom, and then sets the onion on the edge of the cutting board where the ridged stop is located, and while applying holding pressure to the top of the onion with his or her non-dominant hand, draws the blade of the knife sideways into the onion. The initial cut (which is frequently the most difficult to execute) may be measured precisely by guiding the blade at the same height as the stop. Per presently disclosed associated methodology, with all succeeding cuts moving up the subject onion piece, and a user may quickly obtain perfectly diced onions.

Per the foregoing exemplary methodology, once the onions or other sliced or diced items are produced and are laying on the cutting board surface, the user may simply push the processed items with his or her nondominant hand, bench scrapper or like item, into the downward sloping, pre-marked trough (when present in the subject embodiment) at the opposite side of the cutting board. Once there, a quick tap with the side of the user's knife, will provide a measurement of the quantity cut. If more is needed, essentially no time is lost before moving to obtain additional needed product. Once sliced and/or diced pieces fill the correct premeasured area for the recipe, the chef or cook need only reach once for the pan, pot or plate, hold it beneath the trough discharge, and sweep the measured, cut items directly into the pan, pot or plate.

One exemplary embodiment of the presently disclosed subject matter, relates to a customized cutting board. Such cutting board preferably comprises a cutting surface; a gripping stop on a lateral portion of such cutting surface, having a stop upper surface raised above the cutting board cutting surface to engage a food item to be cut, and a preset angled guide cutting portion to guide a user's free hand knife usage; and a recessed, downward sloping trough built in to such cutting surface to receive cut food items to be measured using a pre-marked scale formed in the cutting board trough.

Yet another exemplary embodiment of presently disclosed subject matter relates to a cutting board, comprising a cutting surface; and a gripping stop on a lateral portion of such cutting surface, having a stop upper surface raised above the cutting board cutting surface to engage a food item to be cut, and a preset angled guide cutting portion to guide a user's free hand knife usage.

A still further exemplary embodiment of presently disclosed subject matter relates to a cutting board, comprising a cutting surface; and a recessed, downward sloping trough built in to such cutting surface to receive cut food items to be measured using a pre-marked scale formed in the cutting board trough.

As otherwise referenced herein, it is to be understood that the presently disclosed subject matter equally relates to corresponding and associated methodology. One present exemplary embodiment of the presently disclosed subject matter relates to methodology for using a customized cutting board, comprising providing a cutting surface, having a gripping stop on one lateral portion thereof, and having a recessed, downward sloping trough with a pre-marked scale built in to such cutting surface on the other lateral portion thereof, with such gripping stop having a stop upper surface raised above the cutting board cutting surface and a preset angled guide cutting portion; engaging a food item to be cut with such stop upper surface; and using such preset angled guide cutting portion to guide a user's free hand knife usage to cut the associated food item.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures).

Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended figures, in which.

Repeat use of reference characters throughout the present specification and appended drawings is intended to represent same or analogous features, elements, or steps of the presently disclosed subject matter.

DETAILED DESCRIPTION OF THE PREFERRED EMBODIMENTS

As generally discussed in the Summary of the Presently Disclosed Subject Matter section, the presently disclosed subject matter is concerned with improved apparatus and methodology for devices for assisting cutting of food items.

Selected combinations of aspects of the disclosed technology correspond to a plurality of different embodiments of the presently disclosed subject matter. It should be noted that each of the exemplary embodiments presented and discussed herein should not insinuate limitations of the presently disclosed subject matter. Features or steps illustrated or described as part of one embodiment may be used in combination with aspects of another embodiment to yield yet further embodiments. Additionally, certain features or steps may be interchanged and/or physically reversed with similar devices or features not expressly mentioned which perform the same or similar function.

Figure 1A:
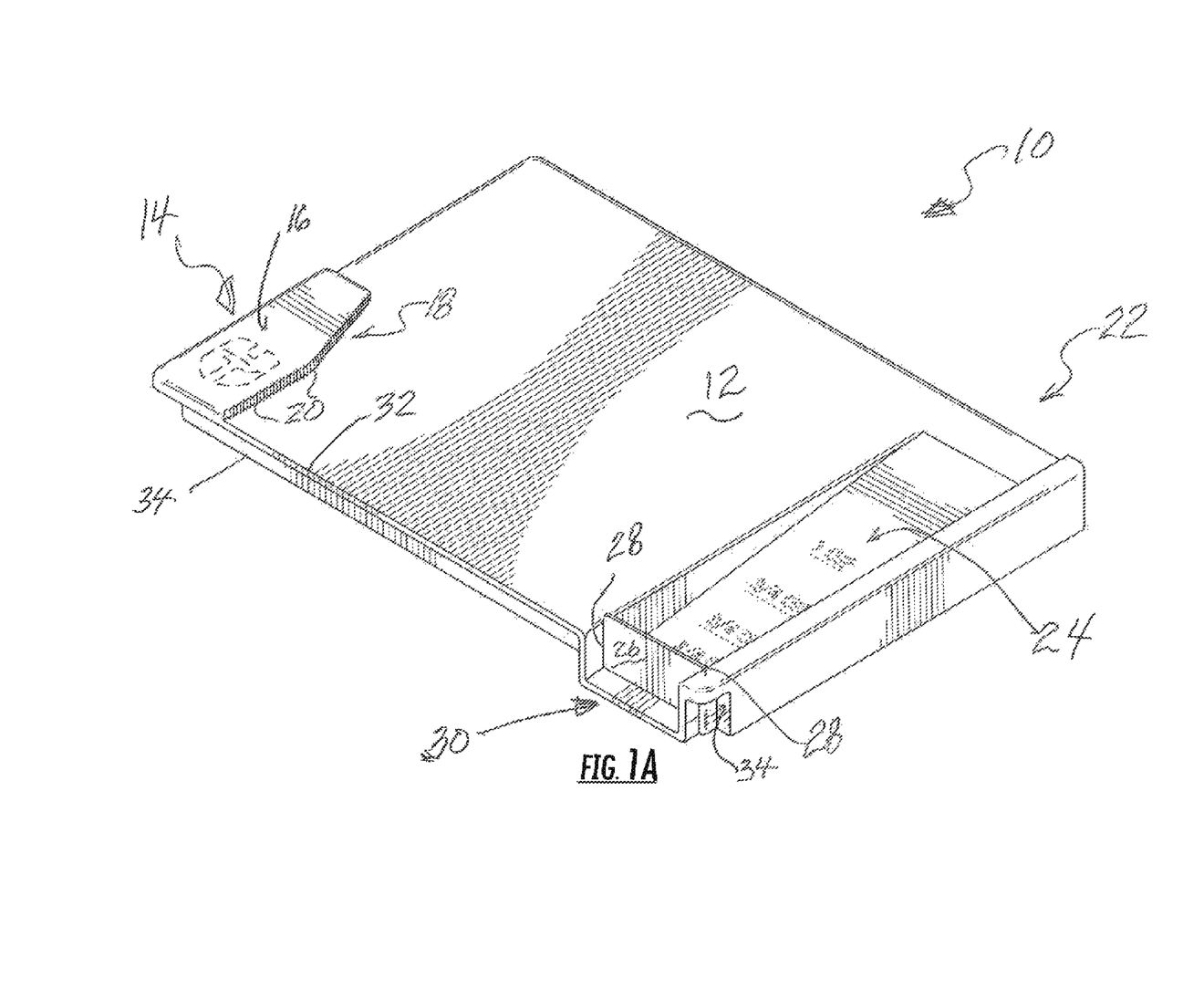
FIG. 1A is a generally top and right side isometric view of an exemplary embodiment of a cutting board in accordance with the presently disclosed subject matter.

Reference will be made in detail to the various exemplary embodiments of a cutting board in accordance with the presently disclosed subject matter. Referring to the drawings, FIG. 1A illustrates generally a top and right side isometric view of an exemplary embodiment of a cutting board generally 10 in accordance with the presently disclosed subject matter. The cutting board 10 includes a cutting surface generally 12 and at least two other prominent features. One such feature is an ergonomically designed gripping stop generally 14 that has a stop upper surface generally 16 which is raised from the cutting board cutting surface 12. Element 14 acts as a "stop" or "block" for one end of a food item to be cut.

The embodiment 10 of FIG. 1A features the ergonomically designed gripping vegetable stop 14. Such element 14 has a specific holder portion (for example, such as for use for holding onions) and a first cut guide portion (to guide free hand knife usage). As shown, element 14 is a raised, angled block, forming a positioning stop 18, for example, for working a vegetable in the center of the cutting board, or for addressing an onion at the front of the cutting board. Such stop element 14 has a plurality of ridged "teeth" 20 on the food item side that securely grip the end of almost all vegetables from carrots and celery to cucumbers and peppers. The angled stop portion generally 18 of feature 14 is specifically designed to position a vegetable or fruit being worked at an exact angle that a person's dominant hand holding a knife will approach the food item. Using such feature of cutting board 10, a user avoids having to awkwardly attempt to find a correct and/or comfortable angle for his or her wrist while wielding a sharp knife. Such angle is pre-set to draw the blade to a perfectly perpendicular cut on the food item.

As illustrated, stop 14 is also designed to form a perfect hold for one of the most difficult tasks faced in food preparation—preparing a diced onion. Per the presently disclosed subject matter, the user simply slices off a small section of the onion to create a flat bottom, and then sets (secures) the onion on the edge of the cutting board where the ridged stop is located, and while applying holding pressure to the top of the onion with his or her non-dominant hand, draws the blade of the knife sideways into the onion. The initial cut—normally the hardest—may be measured precisely by guiding the blade at the same height as the stop 14. All succeeding cuts move up the onion, and within seconds, the user has perfectly diced onions.

A second feature in the cutting board 10 exemplary embodiment of FIG. 1A is a recessed, downward sloping trough or channel generally 22 that cut food items may be easily pushed into and measured in the cutting board by means of a pre-marked scale generally 24 in the cutting board trough. Such scale is not limited to any particular markings, but for some embodiments include various standard measurements, such as portions of a cup (such as ¼, ⅓, ½, ¾, and 1). A user (not shown) may make a quick brush with their hand or some appropriate scrapper in order to direct food items on surface 12 to be dropped directly into channel 22 for measuring. Once a desired amount has been measured, the user again may direct the measured prepared items into a pot or pan, or may drop them directly onto a serving plate, without the need of using another measuring cup or dirtying another plate for the transfer of the food items. A removable block or gate member generally 26 may be received in a pair of opposing slots generally 28. Such block or gate member 26 may be received in slots 28 (otherwise temporarily secured in place) to block food items from leaving channel 22 as they are positioned and accrued in the channel 22 to a desired measurement amount. Once so measured, the block or gate member 26 may be removed or otherwise repositioned to allow the collected and measured food items to be removed down channel 22 through a lower mouth generally 30 of channel 22.

Figure 1B:
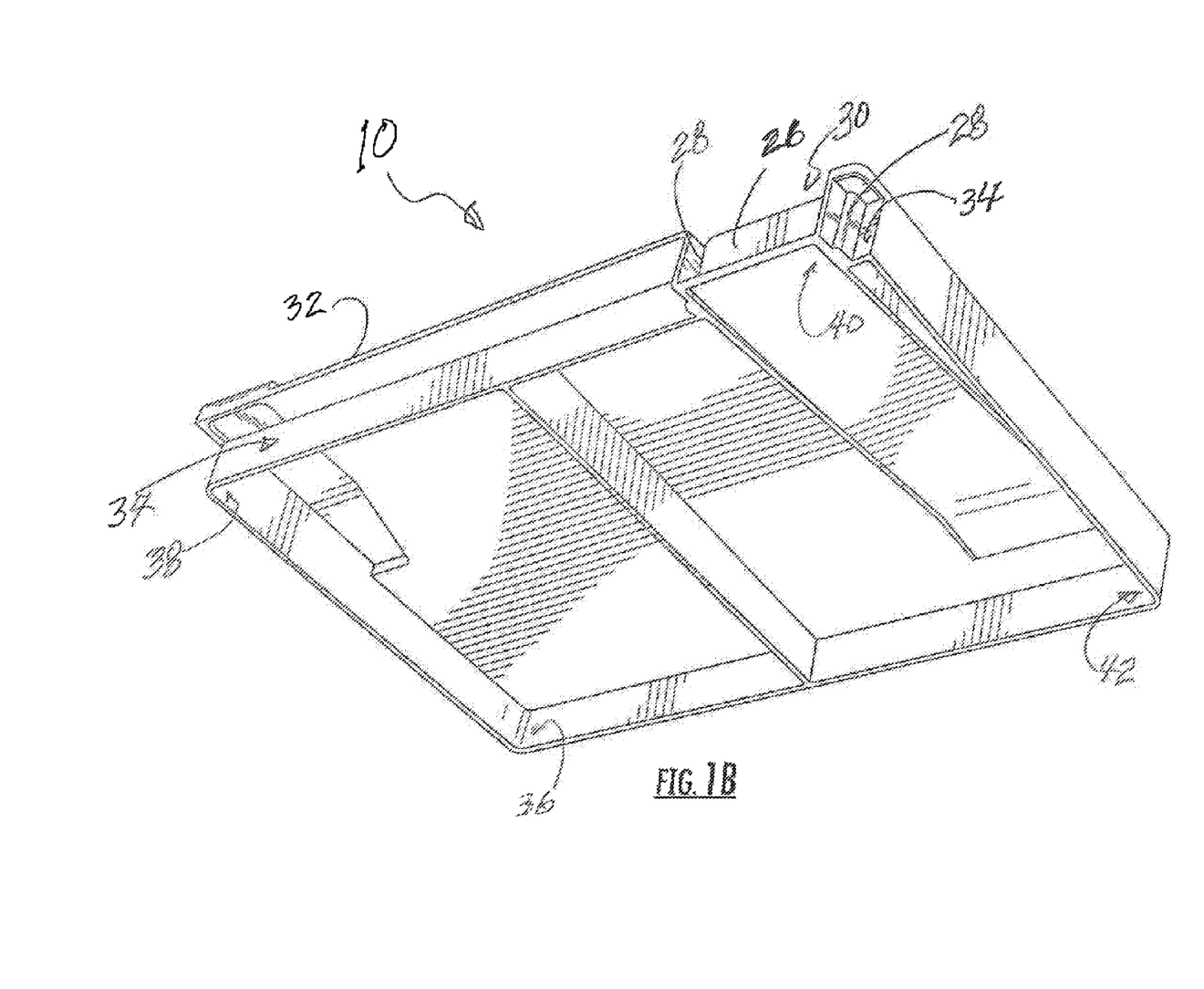
FIG. 1B is a generally bottom and right side isometric view of the subject exemplary embodiment of present FIG. 1A.
Figure 2:
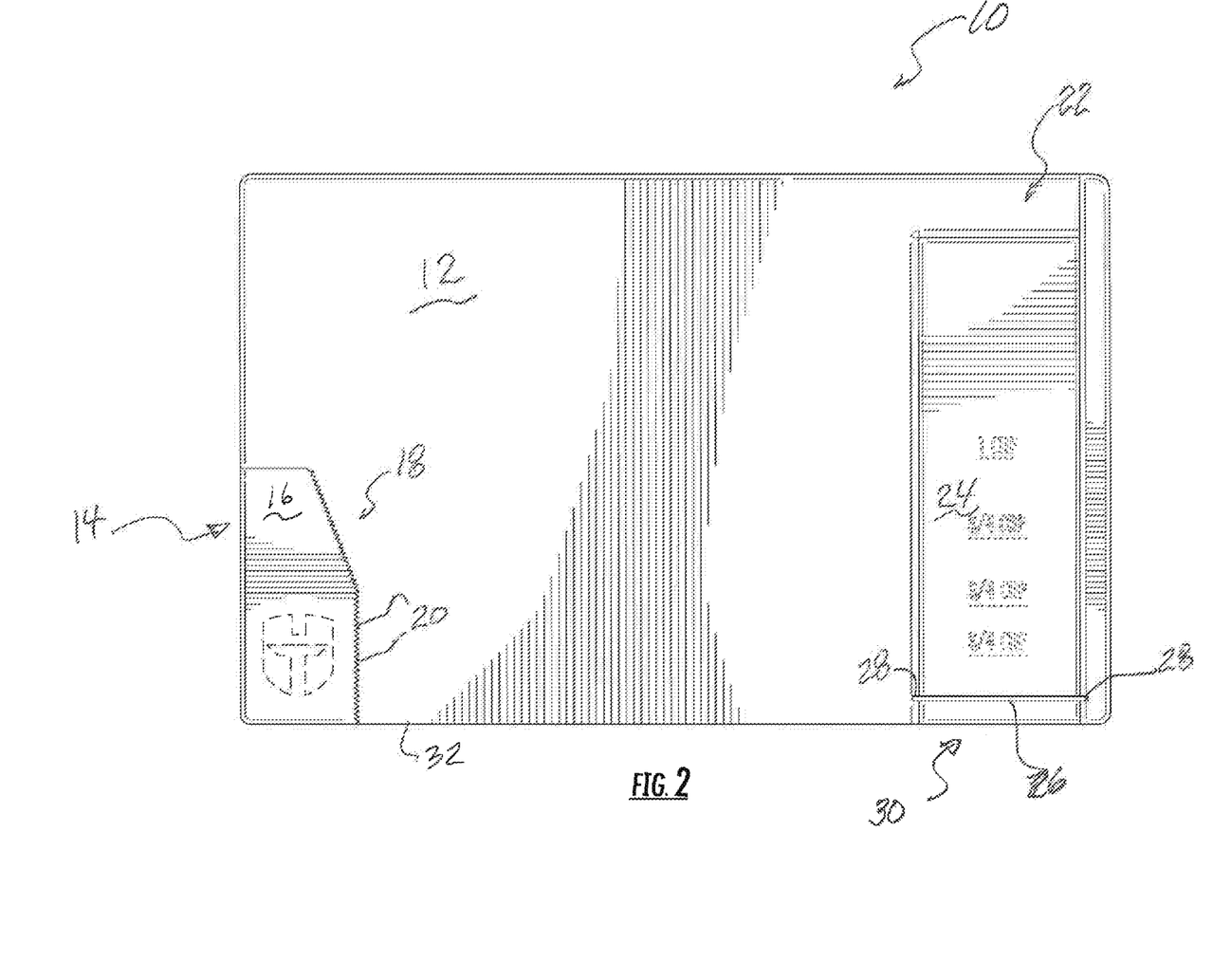
FIGS. 2 and 3 are top and bottom plan views, respectively, of the subject exemplary embodiment of present FIG. 1A.
Figure 3:
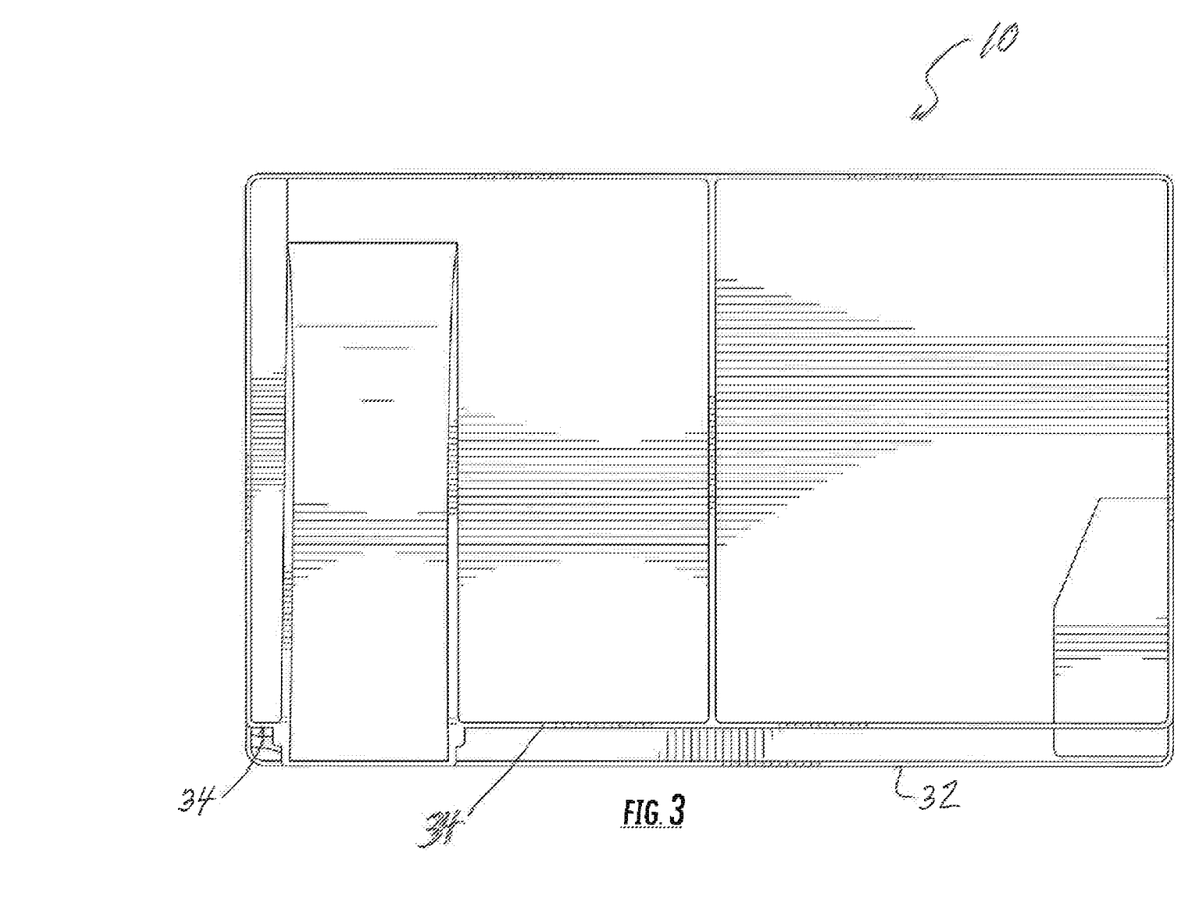
Figure 4:
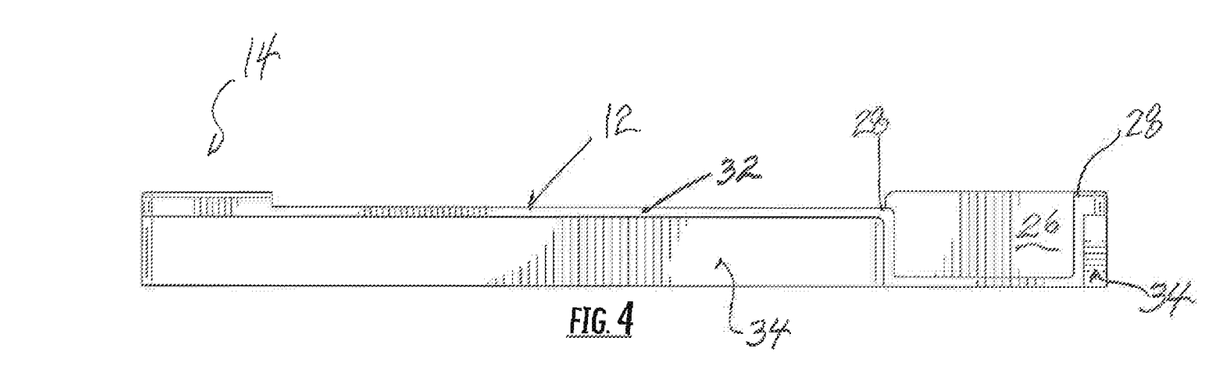
FIGS. 4 and 5 are front and back elevation views, respectively, of the subject exemplary embodiment of present FIG. 1A.
Figure 5:
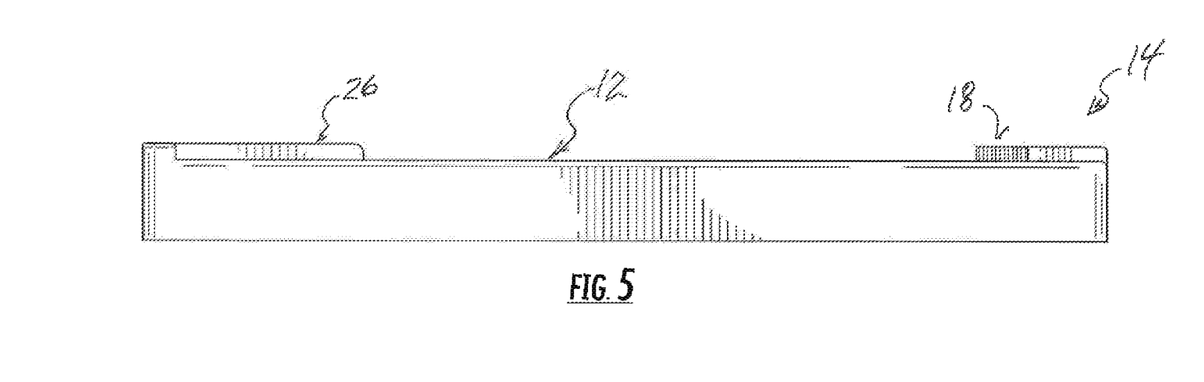
Figure 6:
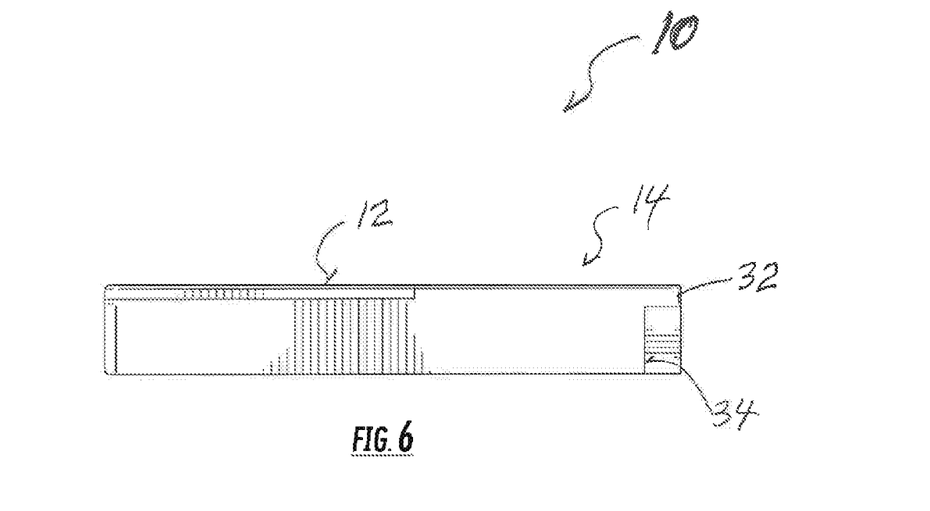
FIGS. 6 and 7 are left and right side elevation views, respectively, of the subject exemplary embodiment of present FIG. 1A.
Figure 7:
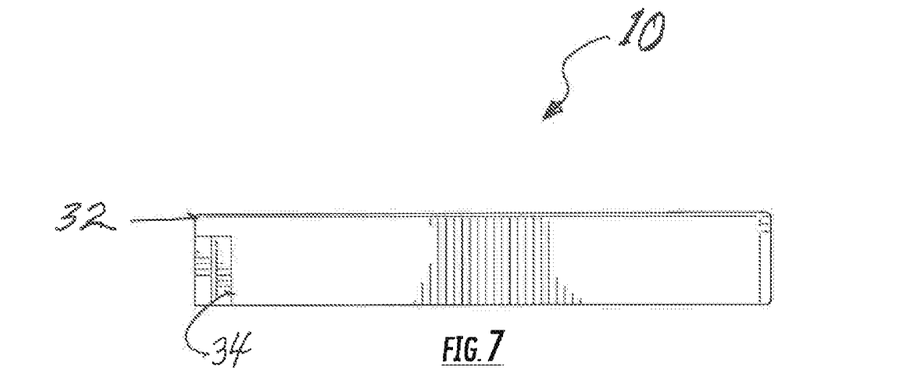

FIG. 1B is a generally bottom and right side isometric view of the subject exemplary embodiment generally 10 of present FIG. 1A. FIGS. 2 and 3 are top and bottom plan views, respectively, of the subject exemplary embodiment of present FIG. 1A, while FIGS. 4 and 5 are front and back elevation views, respectively, of the subject exemplary embodiment of present FIG. 1A, and FIGS. 6 and 7 are left and right side elevation views, respectively, of the subject exemplary embodiment of present FIG. 1A. Repeat use of reference numbers is intended to represent same or analogous features of the subject exemplary embodiment, without requiring complete repeat discussion, as will be understood by those of ordinary skill in the art.

In some versions of the embodiment generally 10 of present FIGS. 1A through 7, a sufficiently rigid, yet lightweight cutting board 10 may be made from high density polyethylene plastic (HDPE) that has been approved "food safe" by the National Science Foundation (NSF). Other similar, moldable plastics may be used. An exemplary embodiment as represented may measure for example twenty (20) inches wide, thirteen (13) inches deep, and approximately one and one half (1½) inches high. Other sizes may be practiced and come within the spirit and scope of the presently disclosed subject matter.

It should also be understood that cutting board 10 may be manufactured intended for either of left-hand dominant or right-hand dominant individuals, with each having an ergonomically designed vegetable cutting stop 14 with teeth 20 designed for their dominant hand.

In use, cutting board 10 may for example be placed on a counter top of standard kitchen height, with such as either a non-slip rubberized mat underneath, or a damp kitchen towel below it, to keep the cutting board from moving during operation.

Front edge generally 32 is specially designed with a recessed base 34, to allow the front edge 32 of the cutting board 10 to extend over the edge of an associated countertop, thereby resulting in the trough discharge 30 extending out so that a pot, pan or dish, may be easily held underneath the trough discharge or mouth 30 to collect the food items quickly and safely. A user thus simply selects any type of knife, and stands in front of the cutting board and begins work.

Operation or methodology of using an exemplary embodiment of a cutting board as disclosed herewith may be practiced as follows. For example, a user (such as cook or chef or some assistant) will first gather food products for processing, such as carrots or celery, to be sliced. Typically, after they are first rinsed, the cleaned food items are set on the counter adjacent to the cutting board, or otherwise kept in the vicinity of such operations. Then, picking up a chosen knife in their dominant hand, the user picks up the carrot or celery stalk and places it in the middle of the cutting board. An initial slice of the end of the carrot or celery stalk best prepares it for placement against the vegetable cutting stop generally 14.

Once one prepared end of the food item is abutted against the cutting stop, the teeth 20 of the stop are used to hold the carrot or celery stable as the user holds the item with his or her non-dominant hand or with a tool. The blade of the selected knife (in the user's dominant hand) is brought to the designed perpendicular angle at the far end of the carrot or celery stalk, and the user begins a series of slices while drawing the holding hand or tool back toward the vegetable stop and following with the cutting knife. The end result is a perfectly sliced carrot or celery, with the pieces easily pushed into the trough 22 by the user's non-dominant hand, tool or bench scraper. The user may turn the knife in his or her hand to a 90 degree angle, tap the slice food items down into the pre-marked measuring areas 24 of the trough 22. Once the correct or desired amount is accumulated in the trough 22, the user may place the knife safely on the counter or cutting board, and place a pot or pan with his or her dominant hand so that the edge of the pan, pot or plate is situated under the trough end 30. Thereafter, the user may sweep the cut food items out of the trough 22 and into the pan with their non-dominant hand, or a tool or bench scrapper.

Another methodology for dicing a food item normally difficult to process involves a task of properly dicing an onion, as follows. In such instance, a user may pick an onion, and cut the onion (such as in half) to create a flat working bottom surface. The cut onion piece may then be placed at the front edge 32 of the cutting board 10 against the perpendicular onion cutting stop extension where teeth 20 are illustrated. While applying holding pressure to the top of the onion with his or her non-dominant hand, a chef or cook may draw the blade of a knife sideways into the onion. Such initial cut may be measured precisely by guiding the blade at the same height as the stop 14. Succeeding cuts may be moved up the onion. Once such series of horizontal cuts are finished, a user may add a few vertical cuts. Thereafter, the user may turn the onion against the stop, such that subsequent slices to the onion deliver perfectly formed diced onions in the middle of the cutting board 10.

For the embodiment of present FIGS. 1A through 7, once the onions or other sliced or diced items are produced and are laying on the cutting board surface 12, the user simply follows the same process of pushing the diced onion with his or her non-dominant hand, bench scrapper or like item, into the downward sloped, pre-marked trough 22 at the opposite side of the cutting board. Once there, a quick tap with the side of the user's knife will settle the cut product towards the bottom of the trough, so that the resulting top-most fill of the trough will provide a measurement of the quantity cut. Thereafter, the chef or cook may position a pan, pot or plate beneath the trough discharge generally 30, and sweep the measured, cut items directly into the pan, pot or plate.

Figure 8:
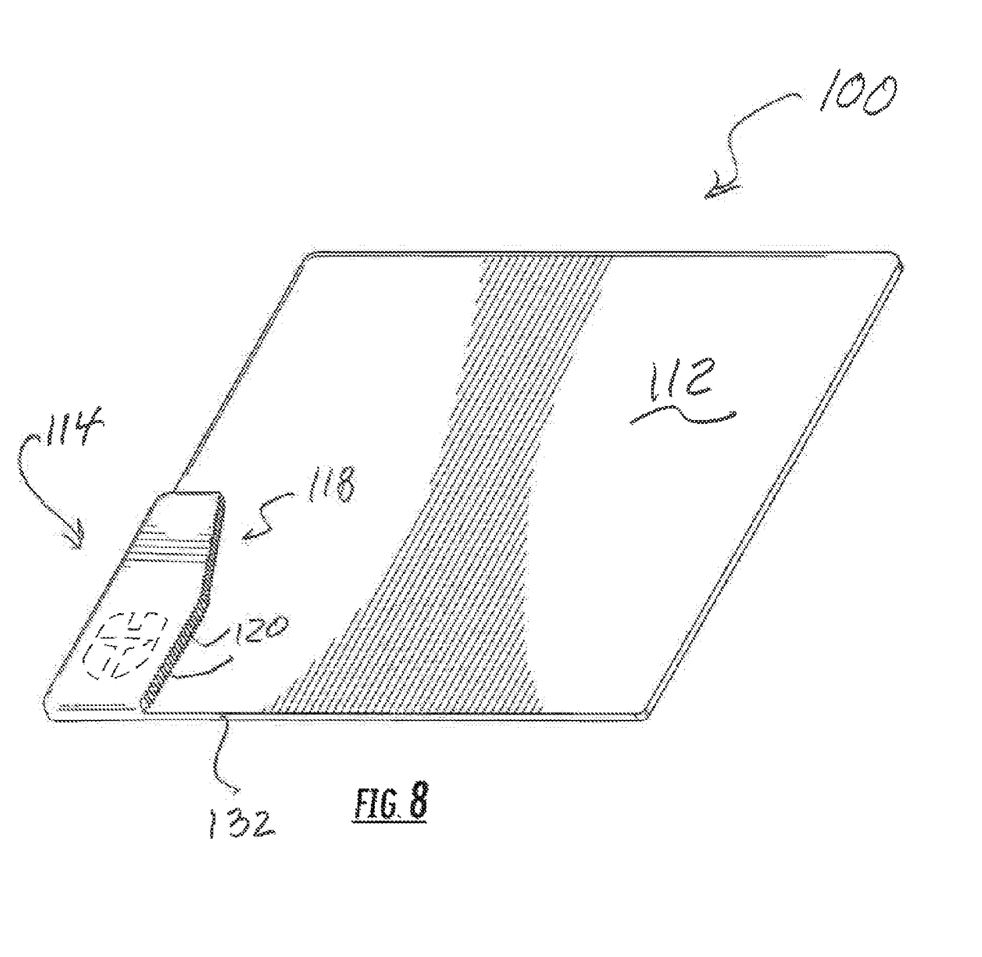
FIG. 8 is a generally top and right side isometric view of another exemplary embodiment of a cutting board in accordance with the presently disclosed subject matter.

FIG. 8 is a generally top and right side isometric view of another exemplary embodiment of a cutting board generally 100 in accordance with the presently disclosed subject matter. In this exemplary embodiment, cutting board 100 has an upper surface generally 112 which interacts with a stop member generally 114 having a predetermined shape and accompanying features, such as with angled surface 118 and teeth 120, similar to surface 18 and teeth 20, respectively of stop member 14 for the exemplary embodiment of cutting board 10. All such repeat features have the same functionality as described in conjunction with such exemplary embodiment of cutting board 10, as will be understood by those of ordinary skill in the art without further detailed explanation.

As shown, the front edge 132 of surface 112 in fact may be relatively then, since the exemplary embodiment generally 100 of FIG. 8 has no corresponding measurement trough, and therefore requires no particular thickness in order to accommodate such feature. By reducing such aspect of the subject exemplary embodiment, fewer materials are required, by which a less expensive and less heavy embodiment may be provided.

Figure 9:
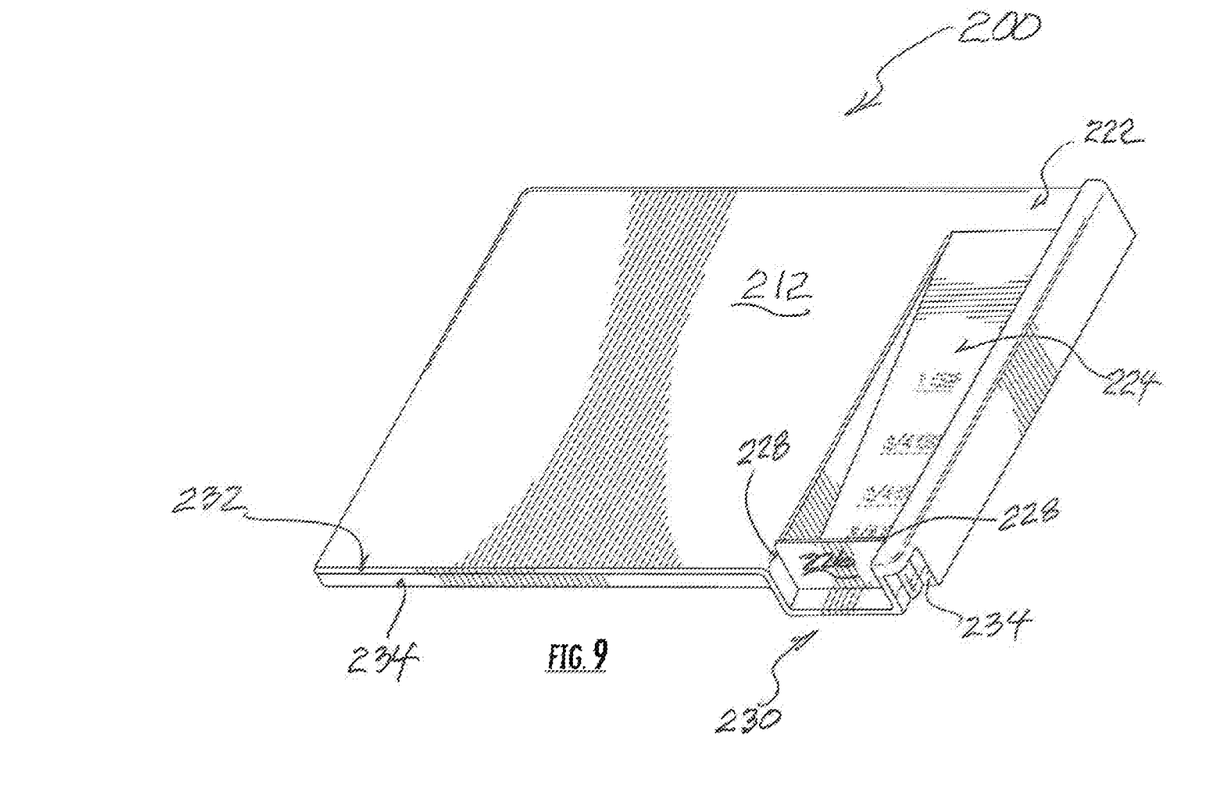
FIG. 9 is a generally top and right side isometric view of yet another an exemplary embodiment of a cutting board in accordance with the presently disclosed subject matter.

FIG. 9 is a generally top and right side isometric view of yet another exemplary embodiment of a cutting board generally 200 in accordance with the presently disclosed subject matter. In this exemplary embodiment, cutting board 200 has an upper surface generally 212 but no interacting stop member as shown in conjunction with cutting hoards 10 and 100. However, like cutting board 10, cutting board 200 includes a measurement, discharge trough generally 222, which has a removable cover or gate 226 interacting with slots 228. Also, a measurement feature 224 may be incorporated into trough 222, to allow a user to sweep cut product into the trough for measuring prior to being discharged through opening or mouth generally 230 thereof.

A front edge generally 232 is also provided and specially designed with a recessed base 234 (similar to base 34 of cutting board 10), to allow the front edge 232 of the cutting board 200 to extend over the edge of an associated countertop, thereby resulting in the trough discharge 230 extending out so that a pot, pan or dish, may be easily held underneath the trough discharge or mouth 230 to collect the food items discharged or ejected from trough 222.

Figure 10A:
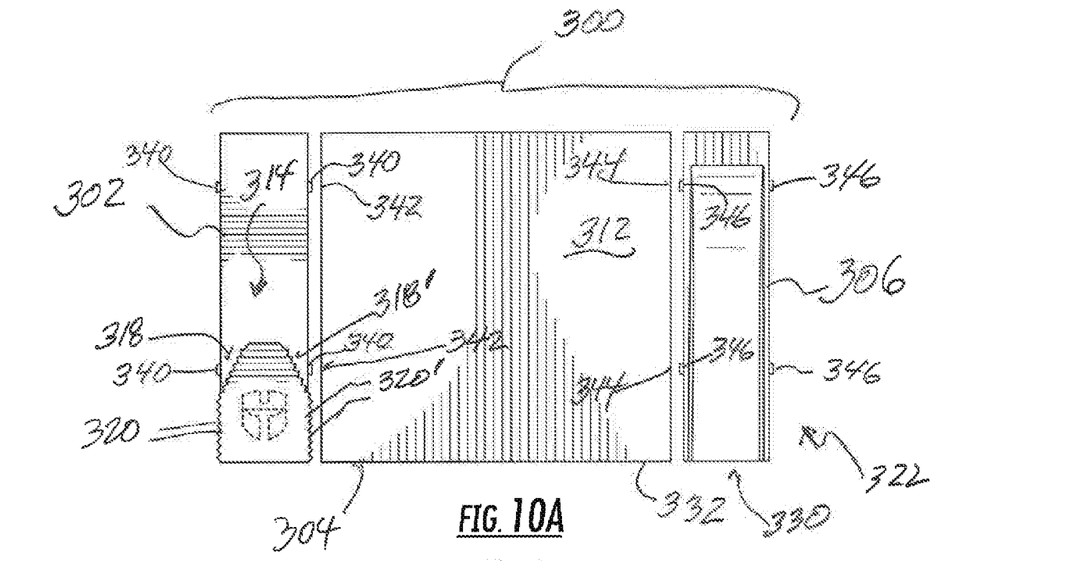
FIGS. 10A and 10B are respective top plan views of still another exemplary embodiment of a cutting board in accordance with the presently disclosed subject matter, having modular components which may be placed together in alternative configurations as represented by such figures.
Figure 10B:
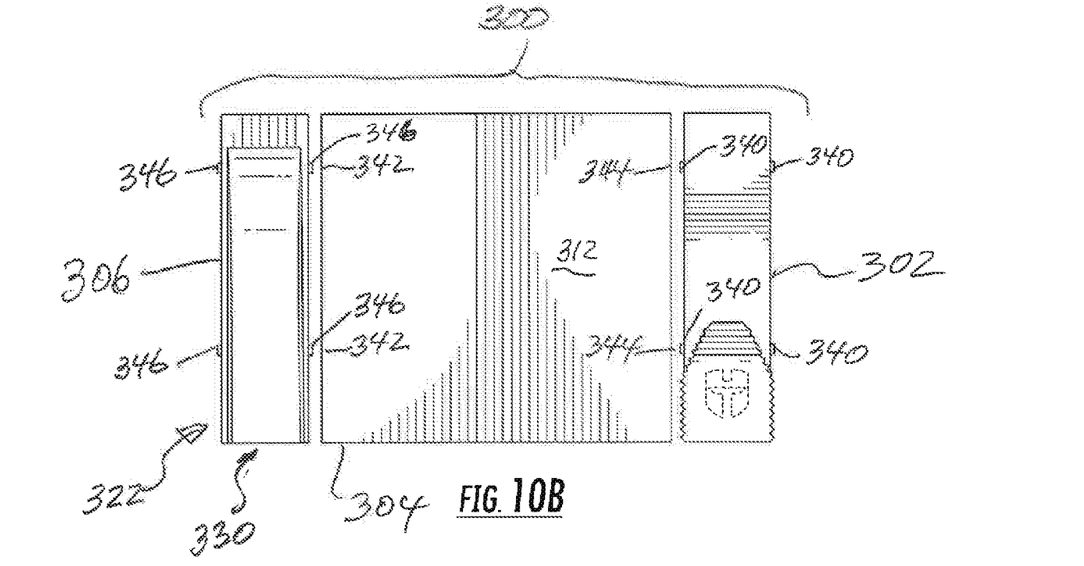

FIGS. 10A and 10B are respective top plan views of still another exemplary embodiment of a cutting board generally 300 in accordance with the presently disclosed subject matter, having modular components which may be placed together in alternative configurations as represented by such figures. As shown, FIG. 10A has an arrangement of three segments or components, generally 302, 304, and 306, respectively.

As evident to those of ordinary skill in the art, such three segments 302/304/306 in FIG. 10A essentially comprise the arrangement of exemplary embodiment cutting board 10 of FIG. 1A, physically segmented into such three portions. One notable difference is that such three segments include various elements which permit them to be removably interconnected, to operate as a unit when joined, or to be reconfigured into alternative arrangements, such as represented by present FIG. 10B. For example, various male and female interconnecting arrangements may be used, as represented by exemplary plural male members generally 340 formed on or attached to segment 302. As will be understood by those of ordinary skill in the art, corresponding plural female connectors generally 342 may be formed in segment 304, and which has cutting surface 312. Plural female connectors generally 344 may be provided on the opposite side edge of segment 304, to engage plural male connectors generally 346 of segment 306, when in the configuration represented by FIG. 10A.

Another notable difference is that the stop feature generally 314 has respective plurality of teeth 320 and 320' on opposite sides thereof perpendicular to front edge 332. Such plurality of teeth also appear on left and right, respectively angled members 318 and 318', which serve as angled placement members which may be used as explained in conjunction with member 18 of present FIG. 1A.

As will be understood by those of ordinary skill in the art, both FIGS. 10A and 10B represent the trough feature generally 322 provided by segment 306, and its associated exit mouth feature 330. Comparing the configurations of FIGS. 10A and 10B, one can understand that segments 302 and 306 are provided in such a way that they can be exchanged with each other, laterally relative to central segment 304, in order to better accommodate either left or right-handed users. Thought of another way, the modular embodiment cutting board 300 presently disclosed is reversible, to accommodate different dominate-hand users.

Also, it is to be understood that FIG. 10B represents that a non-modular version of a cutting board (such as that shown in either of FIG. 1A or FIG. 8) may be made with the features on the lateral sides reversed. Similarly, the configuration of FIG. 9 may be made with the features on the lateral sides reversed. All such variations may be practiced such that the cut food items are manually manipulated, either by a user's hand or hands, or with the assistance of tools or finger protectors of various types (details of which form no particular part of the presently disclosed subject matter).

As shown, providing the cutting board generally 300 of FIGS. 10A and 10B herewith as a three piece, snap together board, creates the ability to interchange the sides of the trough and stop features. For a right-handed user, the trough generally will be snapped (connected) on the right side (as shown also in FIGS. 1A and 10A). For a left-handed user, the trough generally will be snapped (connected) on the left side (as shown in FIG. 10B).

Also, as will be understood, the embodiments represented in either of FIGS. 10A and 10B may be usefully practiced selectively using only two of the three segments or components. In other words, segment 304 may be coupled to either one of segment 302 or 306, and with either one on either lateral side of segment 304, as a user may wish to make use of the presently disclosed subject matter. In this manner, a user may practice cutting techniques with a three piece cutting board that would have allowed the trough and stop to be interchangeable for right or left handed use, or with a desired combination of the two features (gripping stop and measuring trough) to comprise a customized cutting board, or with only one each of the ergonomically designed gripping vegetable stop or the recessed, downward sloping trough, on a designated side. When used, the ergonomically designed gripping vegetable stop may provide both the onion holder feature and the initial cut guide feature, regardless of whether configured for left or right-handed use.

Various other variations of the presently disclosed subject matter may be practiced. For example, for many embodiments, an injection molding process may be readily adapted to provide a cost-efficient result. For other embodiments, a wooden cutting board manufacturer may also be able to mass produce wooden cutting boards with the stop and/or trough features (or the modular embodiment), and still at a cost-efficient point.

Figure 11:
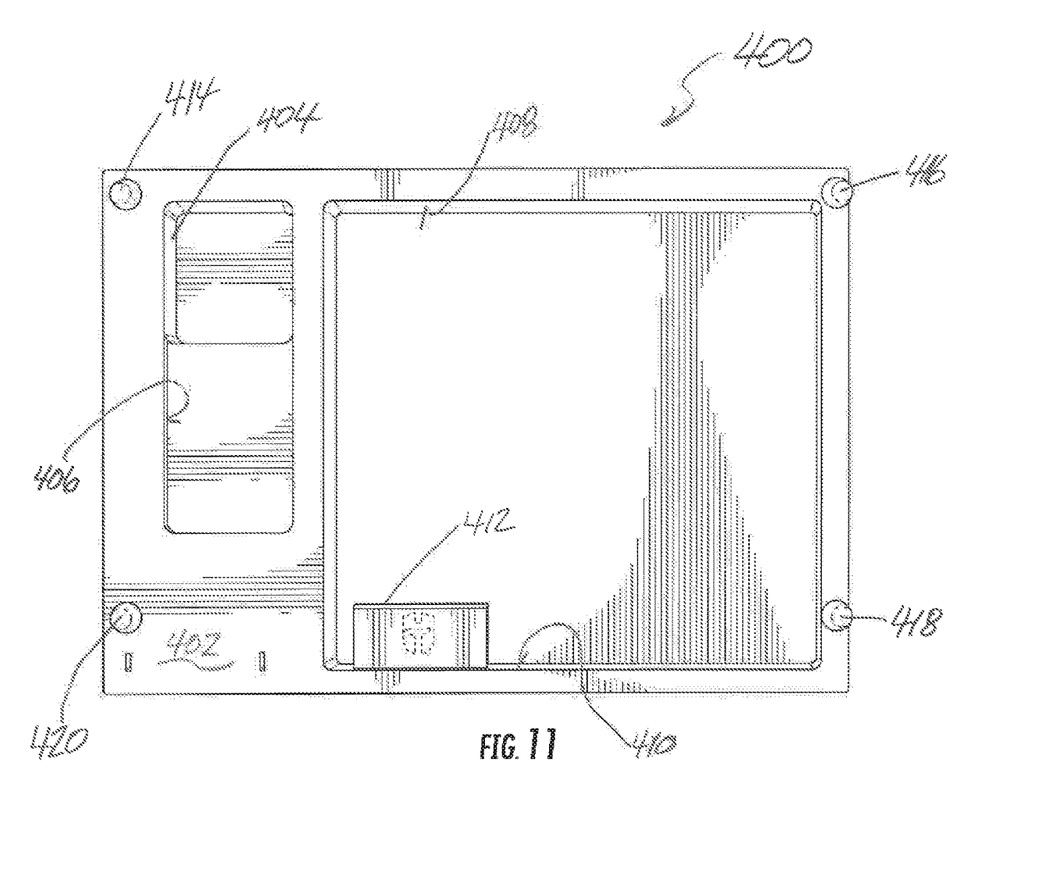
FIG. 11 is a generally plan bottom view of another exemplary embodiment of a cutting board in accordance with the presently disclosed subject matter.
Figure 12:
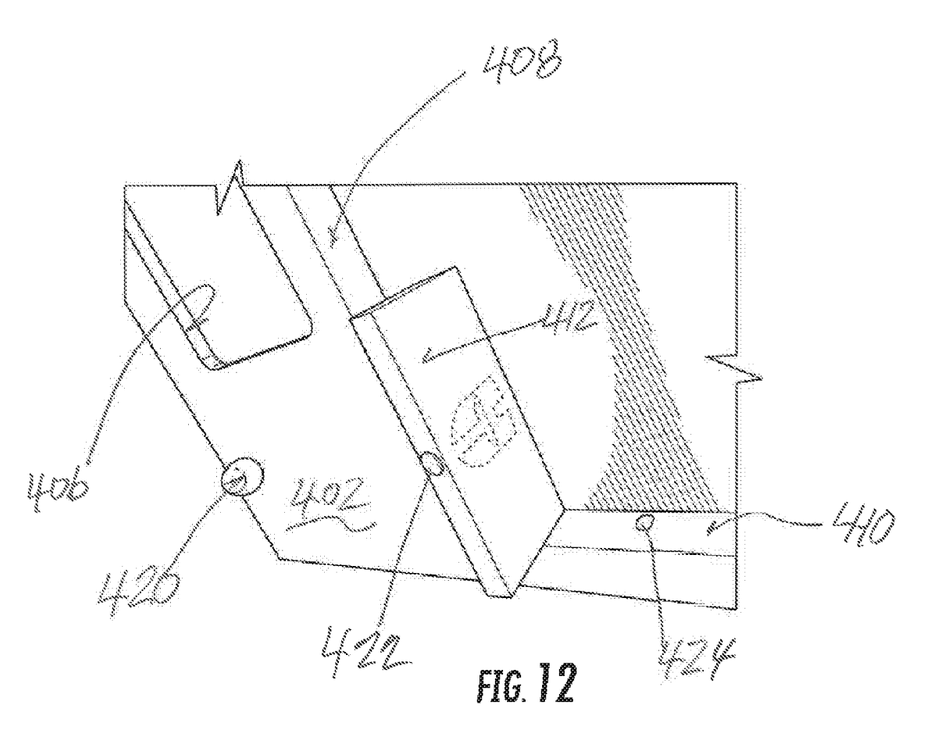
FIG. 12 is a generally enlarged and partly isometric view of a portion of the bottom of the subject exemplary embodiment of present FIG. 11.

FIG. 11 is a generally plan bottom view of another exemplary embodiment of a cutting board generally 400 in accordance with the presently disclosed subject matter, particularly as may be provided in an all wood or solid wood embodiment. FIG. 12 is a generally enlarged and partly isometric view of a portion of the bottom side of the subject exemplary embodiment of present FIG. 11, to show additional possible storage features thereof.

While not shown in FIG. 11, cutting board generally 400 may include various top side features as shown in other figures, such as FIG. 1A, illustrating for example a cutting surface generally 12 having a stop generally 14 along with a channel 22 and a cooperating removable block or gate member 26. All such combinations of features in the context of an all wood embodiment are intended to be represented by the figures of the subject application and the various combinations thereof.

In addition, as further shown by FIG. 11, the back side generally 402 of cutting board 400 may include recessed areas of various depths, which match with the topology of the top side features referenced above. For example, recessed area generally 404 may be relatively deeper into back side surface 402 than an adjacent recessed area generally 406, reflecting the slopping channel surface area which may be practiced for such embodiment.

Also, other recessed areas such as area 408 may be provided, which helps to reduce weight and potential materials cost, while not adversely affecting the performance of the upper or top surface of cutting board 400. Area 408 may also provide an advantage by providing a lower support lip or region generally 410, in which a removable block or gate member generally 412 may be stored when not in use.

FIG. 11 further illustrates inclusion of a plurality of supporting feet 414/416/418/420 which may be affixed to the back side generally 402, for supporting cutting board 400 for either use or storage thereof. As will be readily understood by those of ordinary skill in the art, such feet 414/416/418/420 may comprise resilient members, such as rubber or other materials, which also provide a measure of grip to help hold cutting board 400 in place, without requiring a supporting rubberized mat under the entire cutting board. Alternatively, such feet may be omitted for use with or without a supporting mat. Such feet 414/416/418/420 may be, for example, screw engaged to a cutting board body (such as into surface 402 thereof) or otherwise attached, such as through the use of glue or similar.

As an alternative for other embodiments, such as shown by present FIG. 1B, various mounting structures may be secured in the case of a cutting board structure which does not have a lower surface into which a screw may be mounted. For example, a receiving tube or similar feature may be included in various corners, or locations, such as corners 36/38/40/42 of present FIG. 1B, and into which legs or feet (such as in peg form) may be inserted or installed, to serve as supporting feet for such embodiments. When the embodiment of present FIG. 1B is an injection molded embodiment, such receivers could be formed in such corners as part of the injection molded structure. For any embodiment, other numbers of feet may be utilized, for example, with six supporting feet formed or otherwise provided for a given embodiment.

FIG. 12 shows an additional feature which may be practiced with various embodiments of the presently disclosed subject matter. With the creation of recessed area 408 with storage lip or region 410, additional features may be added for securing member 412 in such region 408. As shown, member 412 may be provided with a recessed or embedded magnetic element generally 422, while region 410 is similarly provided with a magnetic element generally 424. When those magnetic elements 422 and 424 are selected and mounted to have opposing magnetic poles when element 412 is positioned as shown in FIG. 11, they are attracted to each other so as to serve as a way to secure the stored element 412 in area 408. Such magnets can be glued on, recessed, or otherwise attached to the respective features 410 and 412. Also, other ways of securing stored element 412 may be practiced in lieu of magnets, such as complementary catch pieces, such as hook and loop type fasteners, or holding elements where element 412 "clicks" into place or other forms of securement into area 408.

Apart from materials, other variations within the spirit and scope of the presently disclosed subject matter may relate to various physical attributes. For example, various physical sizes or other parameters may be varied for different embodiments. For example, an additional one-quarter of an inch may be used for the height of the toothed stop member relative to the cutting surface, so that it is one half inch in total above the cutting surface.

In another instance, for example involving a wooden-based manufacturer, a slightly smaller cutting board may be produced in wood, with the stop feature but not the measuring trough feature (such as in FIG. 8), so that the cutting board could be both smaller and thinner. For example, the board could be one-quarter of an inch thick with a half-inch thick raised stop portion for a total three-quarters full thickness of the device.

While the presently disclosed subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations, and/or additions to the presently disclosed subject matter as would be readily apparent to one of ordinary skill in the art.

What is claimed is:

1. A customized cutting board, comprising:
   a cutting surface;
   a gripping stop on a lateral portion of said cutting surface, having a stop upper surface raised above the cutting board cutting surface to engage a food item to be cut, and a preset angled guide cutting portion to guide a user's free hand knife usage; and
   a recessed, downward sloping trough built in to said cutting surface to receive cut food items to be measured using a pre-marked scale formed in the cutting board trough; and
   further including a removable gate member associated with said trough to be selectively positioned to block said food items from leaving said trough as they are positioned and accrued in said trough to a desired measurement amount, and selectively repositioned to allow collected and measured said food items to be removed from said trough; and
   a mouth formed in a lower end of said trough, and a pair of slots for selectively receiving said gate member, whereby collected said food items may be removed through said trough mouth whenever said gate member is removed from said pair of slots.

2. The customized cutting board as in claim 1, wherein said gripping stop comprises a raised, angled block having a plurality of ridged teeth to securely grip the food item.

3. The customized cutting board as in claim 2, wherein said preset angled guide cutting portion includes a pre-set angle for drawing a knife blade to a perpendicular cut on food items presented to said ridged teeth.

4. The customized cutting board as in claim 1, further including a bottom side having a plurality of support feet received thereon.

5. The customized cutting board as in claim 1, wherein said cutting board is comprised of at least one of wood and plastic.

6. The customized cutting board as in claim 1, wherein said cutting board is formed by injection molding.

7. The customized cutting board as in claim 1, wherein:
   said gripping stop is formed on a left-hand lateral portion of said cutting surface as the cutting surface faces the user, for use by predominantly right-handed users;
   and said trough is formed in an opposite lateral portion of said cutting surface from said gripping stop.

8. The customized cutting board as in claim 1, wherein:
   said gripping stop is formed on a right-hand lateral portion of said cutting surface as the cutting surface faces the user, for use by predominantly left-handed users;
   and said trough is formed in an opposite lateral portion of said cutting surface from said gripping stop.

9. A customized cutting board, comprising:
   a cutting surface;
   a gripping stop on a lateral portion of said cutting surface, having a stop upper surface raised above the cutting board cutting surface to engage a food item to be cut, and a preset angled guide cutting portion to guide a user's free hand knife usage;
   a recessed, downward sloping trough built in to said cutting surface to receive cut food items to be measured using a pre-marked scale formed in the cutting board trough;
   a removable gate member associated with said trough to be selectively positioned to block said food items from leaving said trough as they are positioned and accrued in said trough to a desired measurement amount, and selectively repositioned to allow collected and measured said food items to be removed from said trough; and
   a bottom side having a recessed area for receiving said removable gate member therein for storage.

10. A cutting board, comprising:
    a cutting surface; and
    a recessed, downward sloping trough built in to said cutting surface to receive cut food items to be measured using a pre-marked scale formed in the cutting board trough;
    a removable gate member associated with said trough to be selectively positioned to block said food items from leaving said trough as they are positioned and accrued in said trough to a desired measurement amount, and selectively repositioned to allow collected and measured said food items to be removed from said trough; and
    a mouth formed in a lower end of said trough, and a pair of slots for selectively receiving said gate member, whereby collected said food items may be removed through said trough mouth whenever said gate member is removed from said pair of slots.

11. The customized cutting board as in claim 10, wherein said cutting board is comprised of at least one of wood and plastic.

12. The customized cutting board as in claim 10, further including, on a lateral side of said cutting surface opposite said trough, a gripping stop having a stop upper surface raised above the cutting board cutting surface to engage a food item to be cut, and a preset angled guide cutting portion to guide a user's free hand knife usage.

13. Methodology for using a customized cutting board, comprising:

providing a cutting surface, having a gripping stop on one lateral portion thereof, and having a recessed, downward sloping trough with a pre-marked scale built in to said cutting surface on the other lateral portion thereof, with said gripping stop having a stop upper surface raised above the cutting board cutting surface and a preset angled guide cutting portion;

engaging a food item to be cut with said stop upper surface;

using said preset angled guide cutting portion to guide a user's free hand knife usage to cut the associated food item;

receiving in the cutting board trough cut food items to be measured;

providing a removable gate associated with said trough for removal of accumulated cut said food items once a desired measured quantity thereof is achieved; and providing said customized cutting board with a bottom side having a recessed area, and selectively storing said removable gate therein when not in use.

14. The methodology as in claim 13, further including providing a plurality of support feet on said cutting board bottom side.

15. The methodology as in claim 13, wherein said gripping stop comprises a raised, angled block having a plurality of ridged teeth to securely grip the food item, and said preset angled guide cutting portion includes a pre-set angle for drawing a knife blade to a perpendicular cut on food items presented to said ridged teeth.

16. The methodology as in claim 13, further including forming said cutting board by injection molding.

17. The methodology as in claim 13, wherein:

said gripping stop is formed on a left-hand lateral portion of said cutting surface as the cutting surface faces the user, for use by predominantly right-handed users;

and said trough is formed in an opposite lateral portion of said cutting surface from said gripping stop.

18. The methodology as in claim 13, wherein:

said gripping stop is formed on a right-hand lateral portion of said cutting surface as the cutting surface faces the user, for use by predominantly left-handed users;

and said trough is formed in an opposite lateral portion of said cutting surface from said gripping stop.

\* \* \* \* \*

UNITED STATES PATENT AND TRADEMARK OFFICE
CERTIFICATE OF CORRECTION

PATENT NO. : 11,026,545 B2  
APPLICATION NO. : 16/100522  
DATED : June 8, 2021  
INVENTOR(S) : Donna Plant Taylor Page 1 of 1

It is certified that error appears in the above-identified patent and that said Letters Patent is hereby corrected as shown below:

On the Title Page

"Related U.S. Application Data" should read as follows:
(60) Provisional Application No. 62/605,644, filed on Aug. 21, 2017
Design Application No. 29/638,679 filed on Feb. 28, 2018

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*